United States Patent
Ko

(10) Patent No.: US 6,697,950 B1
(45) Date of Patent: Feb. 24, 2004

(54) METHOD AND APPARATUS FOR DETECTING A MACRO COMPUTER VIRUS USING STATIC ANALYSIS

(75) Inventor: Cheuk W. Ko, San Jose, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/469,758

(22) Filed: Dec. 22, 1999

(51) Int. Cl.[7] .................. G06F 11/30; G06F 12/14; H04L 9/32
(52) U.S. Cl. .................. 713/201; 713/200; 713/188; 714/38
(58) Field of Search ................ 713/200, 188, 713/201; 714/38

(56) References Cited

U.S. PATENT DOCUMENTS 5,951,698 A * 9/1999 Chen et al. ................. 714/38
5,956,481 A * 9/1999 Walsh et al. ................ 713/200

\* cited by examiner

*Primary Examiner*—Gilberto Barron
*Assistant Examiner*—Joseph M McArrdle

(74) *Attorney, Agent, or Firm*—Silicon Valley IP Group, PC; Kevin J. Zilka; Christopher J. Hamaty

(57) ABSTRACT

One embodiment of the present invention provides a system that detects a macro virus in a computer system by statically analyzing macro operations within a document. The system operates by receiving the document containing the macro operations. The system locates the macro operations within the document, and performs a flow analysis on the macro operations within the document to determine associated values for variables within the macro operations. Next, the system compares the macro operations including the associated values for variables against a profile containing information about suspect macro operations and associated values for variables to determine whether the document contains suspect macro operations. If so, the system informs a user that the document contains suspect macro operations. In one embodiment of the present invention, after informing the user, the system receives instructions from the user specifying an action to take with regards to the document. In a variation on this embodiment, the action can include, deleting the document or cleaning the document to remove suspect macro operations. Note that it is possible to perform static analysis on macro viruses, because unlike other viruses that are propagated in executable code form, macro viruses are propagated in source code form, which is more amenable to static analysis than executable code.

26 Claims, 2 Drawing Sheets

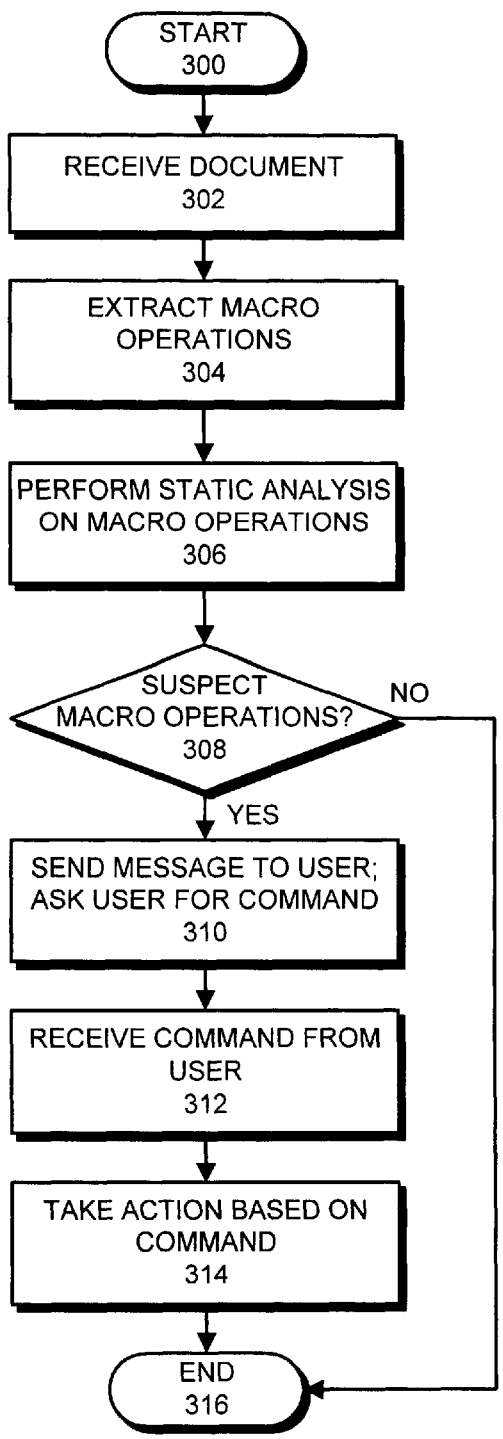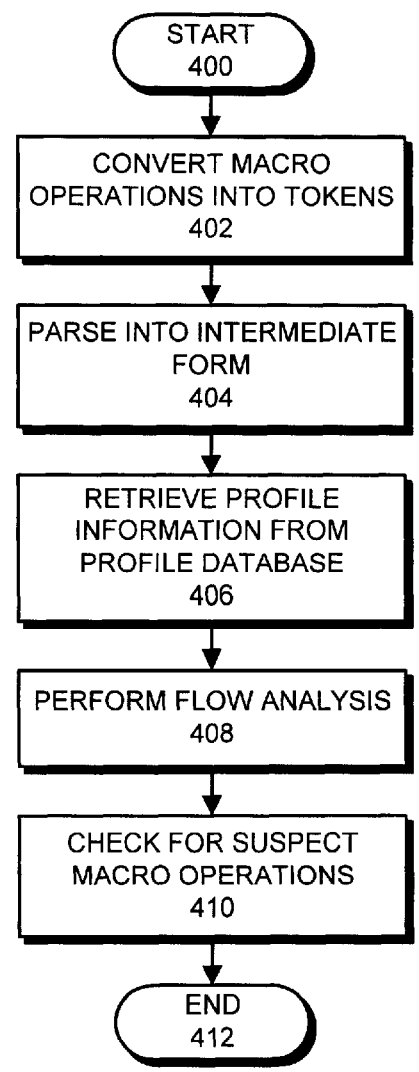
FIG. 3
FIG. 4

METHOD AND APPARATUS FOR DETECTING A MACRO COMPUTER VIRUS USING STATIC ANALYSIS

BACKGROUND

1. Field of the Invention

The present invention relates to computer viruses. More specifically, the present invention relates to a method and an apparatus for detecting a macro virus in a computer system by statically analyzing macro operations in a document to determine whether the macro operations give rise to security violations in the computer system.

2. Related Art

The advent of computer networks has led to an explosion in the development of applications that facilitate rapid dissemination of information. For example, electronic mail is becoming the predominant method for communicating textual and other non-voice information. Using electronic mail, it is just as easy to send a message to a recipient on another continent as it is to send a message to a recipient within the same building. Furthermore, an electronic mail message typically takes only a few minutes to arrive, instead of the days it takes for surface mail to snake its way along roads and through airports.

While applications such as electronic mail facilitate rapid dissemination of information, they can also act as a conduit in spreading computer viruses between computer systems. If designed properly, a computer virus can spread itself between millions of computer systems that are linked together through computer networks in only a few short hours. Once a computer virus infects a computer system, it can perform malicious actions, such as destroying important data, causing the computer system to fail or monopolizing computer system resources. Computer viruses can also tie up computer networks by generating large numbers of communications that spread the computer virus.

As developers of computer viruses have become more sophisticated, they have generated new forms of computer viruses. In particular, macro viruses have recently caused a great deal of trouble. In March of 1999, a macro virus, known as the "Melissa virus" rapidly spread to millions of computer systems worldwide, causing hundreds of millions of dollars in lost productivity, and snarling computer networks with large volumes of email traffic.

Macro viruses, such as the Melissa virus, operate by exploiting macro operations that often appear within documents used by applications, such as word processors. For example, macro operations are supported by the "Microsoft Word" word processor program, which is distributed by the Microsoft Corporation of Redmond, Wash. Historically, macro operations have been used to perform operations on the documents in which they appear. However, macro operations are becoming increasingly more powerful, and they are presently able to perform actions such as sending electronic mail and deleting files. In particular, the Melissa virus is contained within a Microsoft Word document that is attached to an email message. When a user opens the Word document, the macro operations within the Word document cause 50 copies of the email message to be sent to email addresses retrieved from an address book on the infected computer system.

A number of techniques are presently being used to detect computer viruses. Commonly used virus scanners perform pattern matching on code to determine whether a known virus is present in the code. Pattern matching is a very simple technique, and leads to a very low false alarm rate. However, pattern matching is unable to detect new viruses.

Another technique is to emulate the code in an insulated environment, to determine whether the code performs malicious actions. Unfortunately, emulation can be very time-consuming, and it is impossible to exhaustively emulate every pathway through the code.

What is needed is a method and an apparatus that is able to detect new macro computer viruses without the time-consuming processing involved in emulation.

One method for locating suspect macro operations is disclosed in U.S. Pat. No. 5,951,698, entitled "System, Apparatus and Method for the Detection and Removal of Viruses in Macros," by Chen, et al. This method operates by scanning through a document looking for suspect macro operations. Unfortunately, more information is often required in order to determine whether a macro operation is suspect. For example, a macro operation that writes to a file may not be suspect by itself, but if the macro operation writes to a system configuration file it is suspect. In order to determine which file a macro operation writes to, it is typically necessary to determine the value of a "filename" variable. This variable value cannot be determined from simply examining the macro operation: more analysis is required.

Additionally, what is needed is a method and an apparatus that is able to detect new macro computer viruses based upon values of variables within the macro operations.

SUMMARY

One embodiment of the present invention provides a system that detects a macro virus in a computer system by statically analyzing macro operations within a document. The system operates by receiving the document containing the macro operations. The system locates the macro operations within the document, and performs a flow analysis on the macro operations within the document to determine associated values for variables within the macro operations. Next, the system compares the macro operations including the associated values for variables against a profile containing information about suspect macro operations and associated values for variables to determine whether the document contains suspect macro operations. If so, the system informs a user that the document contains suspect macro operations.

In one embodiment of the present invention, after informing the user, the system receives instructions from the user specifying an action to take with regards to the document. In a variation on this embodiment, the action can include, deleting the document or cleaning the document to remove suspect macro operations.

In one embodiment of the present invention, the profile includes information specifying suspect macro operations.

In one embodiment of the present invention, the profile includes information specifying non-suspect macro operations. In this case, all other operations are considered suspect.

In one embodiment of the present invention, performing the flow analysis involves performing data flow and control flow analysis on the macro operations.

In one embodiment of the present invention, the system informs the user by specifying a level of safety for the macro operations.

In one embodiment of the present invention, the system receives the macro operations in source code form.

In one embodiment of the present invention, the system informs the user that the macro operations can perform a suspect action, such as modifying data within another document, modifying other files in the computer system, deleting other files in the computer system, modifying operating system parameters in the computer system, exhausting a resource in the computer system, killing a process in the computer system, sending an electronic mail message to another computer system, causing a program to be run on the computer system, modifying macro operations in the document, locking a file in the computer system, and invoking a common object model (COM) object in the computer system.

In one embodiment of the present invention, the document can include a word processing document, a spreadsheet document, a presentation document, or a graphical image document.

In one embodiment of the present invention, determining whether the macro operations specify suspect behavior may include using one of the following factors: an identity of the user who is executing the macro operations in the document; an identity of an owner of an object upon which a macro operation operates; and information specifying a context in which a macro operation is called.

Note that it is possible to perform static analysis on macro viruses, because unlike other viruses which are propagated in executable code form, macro viruses are propagated in source code form, which is more amenable to static analysis.

BRIEF DESCRIPTION OF THE FIGURES

FIG. 3 is a flow chart illustrating the process of analyzing macro operations within a document in accordance with an embodiment of the present invention.

FIG. 4 is a flow chart illustrating the process of performing flow analysis on macro operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may include any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
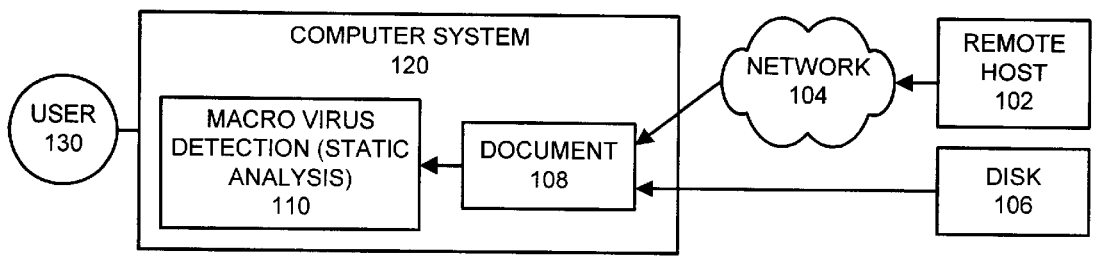
FIG. 1 illustrates a computer system that receives a document in accordance with an embodiment of the present invention.

FIG. 1 illustrates computer system 120 that receives a document 108 in accordance with an embodiment of the present invention. Computer system 120 can generally include any can include any type of computer system, including, but not limited to, a computer system based on a microprocessor, a mainframe computer, a digital signal processor, a personal organizer, a device controller, and a computational engine within an appliance. Computer system 120 generally operates under control of user 130. User 130 can include a human computer system operator or alternatively a control processor that controls the actions of computer system 120.

Computer system 120 receives document 108 from a source external to computer system 120. For example, FIG. 1 illustrates that document 108 can be received from remote host 102 through network 104, or, alternatively through a disk 106. Network 104 can include any type of wire or wireless communication channel capable of coupling together computing nodes. This includes, but is not limited to, a local area network, a wide area network, or a combination of networks. In one embodiment of the present invention, network 104 includes the Internet. Remote host 102 can include any type of node on network 104 that is capable of transmitting document 108 to computer system 120. In one embodiment of the present invention, document 108 is sent as an attachment to an electronic mail message sent from remote host 102 to computer system 120.

Disk 106 can include any type of computer-readable storage medium that is capable of storing document 108 and that can be read by computer system 120. For example, disk 106 can include a magnetic floppy disk, a magneto-optical disk or an optical compact disk. Note that in general document 108 can be received through any mechanism that can be used to input document 108 into computer system 120.

Document 108 can include any type of file or other aggregation of data that can contain macro operations. For example, document 108 can include a word processing document that includes text and formatting information. Document 108 can also include a spread sheet, a graphical image or a graphical presentation, such as a POWERPOINT™ document. (Powerpoint is a trademark of the Microsoft Corporation of Redmond, Wash.)

The macro operations in document 108 are triggered in response to actions being performed on the document 108. For example, certain macro operations can be triggered in response to a document being opened, while other macro operations can be triggered in response to the document being closed. Also note that the term "macro operation" or macro instruction as used in this document does not refer to preprocessing instructions for a compiler that are commonly found in computer program source code. Instead, the term "macro operation" refers to an operations (or instruction) for an application other than a compiler that is found in a document that does not contain computer source code.

Document 108 feeds into macro virus detection module 110 before it is allowed to be opened or otherwise manipulated by computer system 120. Macro virus detection module 110 performs a static analysis on document 108 in order to detect any possible viruses as is described below with reference to FIGS. 2–4.

Macro Virus Detection Mechanism

Figure 2:
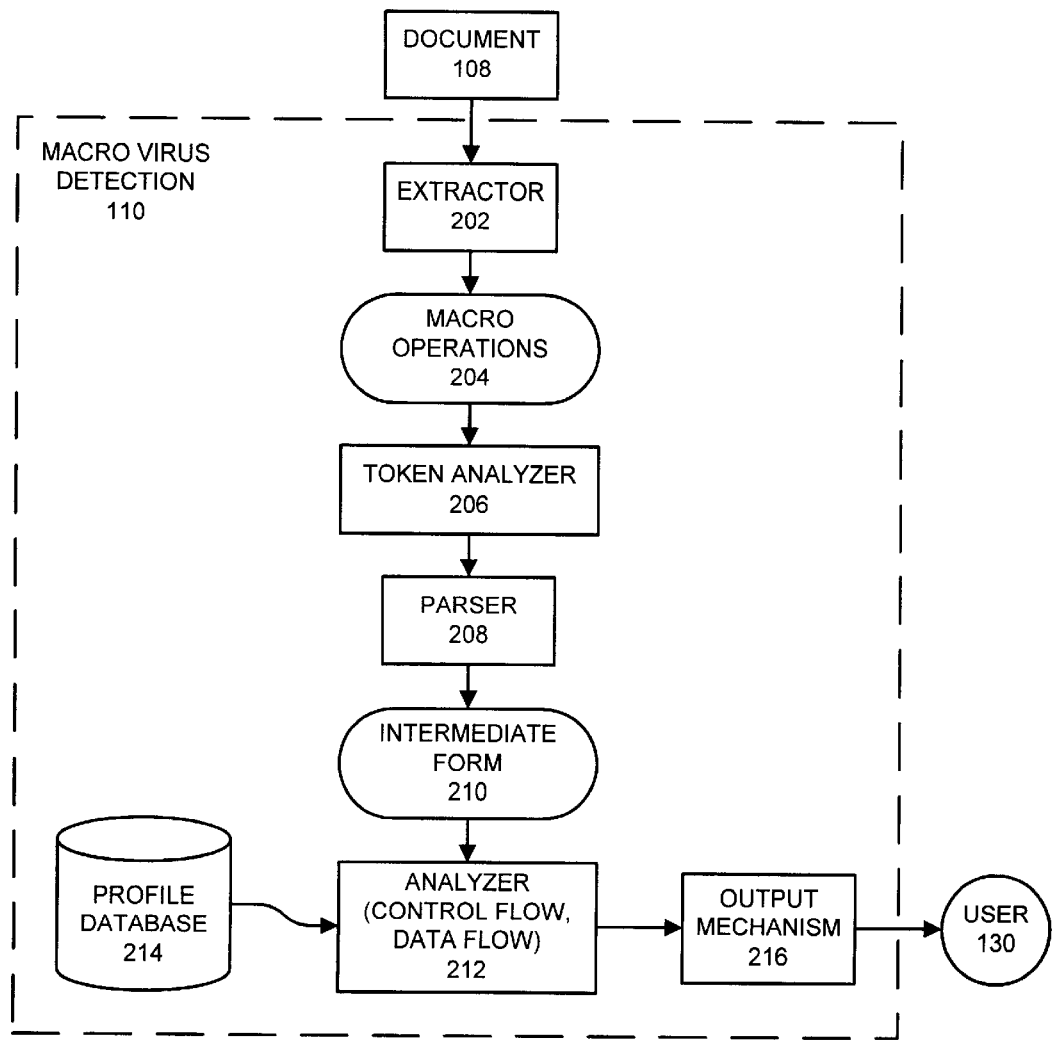
FIG. 2 illustrates the structure of a macro virus detection mechanism in accordance with an embodiment of the present invention.

FIG. 2 illustrates the structure of a macro virus detection module 110 in accordance with an embodiment of the present invention. Macro virus detection module 110 analyzes document 108 and informs user 130 if macro operations within document 108 perform suspect actions. These suspect actions may indicate the presence of a macro virus. Macro virus detection module 110 includes extractor 202, token analyzer 206, parser 208, analyzer 212, profile database 214 and output mechanism 216.

Extractor 202 extracts macro operations 204 from document 108. Note that macro operations 204 are in human readable source code form. Macro operations 204 feed through token analyzer 206, which converts macro operations 204 into tokens, which feed through parser 208. This produces a representation of the macro operations in intermediate form 210.

Intermediate form 210 feeds in analyzer 212, which performs control flow analysis and data flow analysis on the macro operations. This includes both forward data flow and backwards data flow analysis on the macro operations. Analyzer 212 compares macro operations encountered during the flow analysis with suspect macro operations specified in profile database 214. These suspect operations can include operations such as modifying data within another document, modifying other files in the computer system, deleting other files in the computer system, modifying operating system parameters in the computer system, exhausting a resource in the computer system, killing a process in the computer system, sending an electronic mail message to another computer system, causing a program to be run on the computer system, modifying macro operations in the document, locking a file in the computer system, and invoking a common object model (COM) object in the computer system.

Note that profile database 214 can be organized under an object model, which defines items such as documents and macro operations, as well as operating system abstractions such as files, directories, hosts, networks and users. Also note that profile database 214 can contain information specifying non-suspect operations, such as accessing data within the same document as the macro operation. In one embodiment of the present invention, macro operations that are not identified as being non-suspect macro operations are identified as suspect macro operations.

Profile database 214 may also include rules, such as specifying that a document is "safe" if macro operations within the document access data within the document or read data from other documents that are open at the same time. If suspect operations are identified in document 108, output mechanism 216 informs user 130 that such suspect operations have been identified.

Process of Examining Macro Operations

FIG. 3 is a flow chart illustrating the process of examining macro operations within a document in accordance with an embodiment of the present invention. The system starts by receiving a document 108 at computer system 120 (step 302). Next, extractor 202 extracts macro operations 204 from document 108 (step 304). The system then performs a static analysis on macro operations 204 (step 306). The process is described in more detail below with reference to FIG. 4. Next the system determines if any suspect macro operations have been identified (step 308). If so, the system sends a message to user 130, and asks user 130 for a command specifying an action to be performed (step 310). Next, the system receives a command from user 130 (step 312). For example, the command may specify that document 108 should be deleted, that document 108 should be cleaned so that it no longer contains suspect macro operation, or that no action should be taken. Next, the system takes an action to carry out the command received from user 130 (step 314).

Flow Analysis

FIG. 4 is a flow chart illustrating the process of performing static flow analysis on macro operations in accordance with an embodiment of the present invention. This flow chart illustrates in more detail the operations involved in performing in step 306 in FIG. 3. First, token analyzer 206 converts macro operations 204 into tokens (step 402). These tokens feed into parser 208, which parses the tokens into intermediate form 210 (step 404). Next, analyzer 212 retrieves profile information about suspect macro operations from profile database 214 (step 406), and then performs flow analysis (step 408) (including a control flow analysis and a data flow analysis) on the macro operations. This flow analysis determines the values for variables within the macro operations. During this flow analysis, analyzer 212 checks for suspect macro operations (step 410). In doing so, analyzer 212 compares the macro operations (including the associated values for variables) against a profile containing information about suspect macro operations and associated values for variables.

Through flow analysis, the system obtains information about the execution of the macros without actually executing them. A macro is specified in a macro programming language that contains control flow structure (e.g., if-then-else, while, . . .) and variables. Within a macro, a specific operation/statement may be executed zero, one, or more times depending on how the macro is structured. Control flow analysis can be used to determine how many times a specific operation is executed.

Additionally, a macro operation can contain variables that specify some important characteristics of the operation. In some cases, it is not possible to determine whether an operation is suspicious or not without knowledge about the possible values of these variables.

Through flow analysis is it possible to locate macro statements that set a variable to a value. For example, consider the following macro operations:

1. Dim filename As String
2. filename="c:\win.ini"
3. open filename for write as 1

Using data flow and control flow analysis, we can determine that the definition of the variable "filename" can only come from the statement in line 2. Therefore, we know the operation on line 3 will open c:\win.ini for writing, which is a suspicious operation. Without information on the value of the filename variable, all we know is the macro opens a file for writing. This information may not be sufficient to determine whether the macro operation is suspicious or not.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for detecting a macro virus in a computer system by statically analyzing macro operations within a document, comprising:
   receiving the document containing the macro operations;
   locating the macro operations within the document;
   performing a flow analysis on the macro operations within the document to determine associated values for variables within the macro operations, wherein performing the flow analysis on the macro operations includes performing at least one of a data flow analysis and a control flow analysis;

comparing the macro operations including the associated values for variables against a profile containing information about suspect macro operations and associated values for variables to determine whether the document contains suspect macro operations; and if the document contains suspect macro operations, informing a user that the document contains suspect macro operations.

2. The method of claim 1, further comprising after informing the user, receiving instructions from the user specifying an action to take with regards to the document.

3. The method of claim 2, wherein the action can include one of:

deleting the document;

cleaning the document to remove suspect macro operations; and not taking any action.

4. The method of claim 1, wherein the profile includes information specifying suspect macro operations.

5. The method of claim 1, wherein the profile includes information specifying non-suspect macro operations.

6. The method of claim 1, wherein performing the flow analysis on the macro operations includes performing the data flow analysis and the control flow analysis.

7. The method of claim 1, wherein informing the user includes specifying a level of safety for the macro operations.

8. The method of claim 1, wherein the macro operations are received in source code form.

9. The method of claim 1, wherein informing the user includes informing the user that the macro operations in the document can potentially do one of, modifying data within another document;

modifying other files in the computer system;

deleting other files in the computer system;

modifying operating system parameters in the computer system;

exhausting a resource in the computer system;

killing a process in the computer system;

sending an electronic mail message to another computer system;

causing a program to be run on the computer system;

modifying macro operations in the document;

locking a file in the computer system; and invoking a common object model (COM) object in the computer system.

10. The method of claim 1, wherein the document can include one of:

a word processing document;

a spreadsheet document;

a presentation document; and a graphical image document.

11. The method of claim 1, wherein determining whether the macro operations specify suspect behavior includes using at least one of the following factors in determining if the macro operations specify suspect behavior:

an identity of the user who is executing the macro operations in the document;

an identity of an owner of an object upon which a macro operation operates; and information specifying a context in which a macro operation is called.

12. A method for detecting a macro virus in a computer system by statically analyzing macro operations within a document, comprising:

receiving the document containing the macro operations, the macro operations being in source code form;

locating the macro operations within the document;

performing a flow analysis on the macro operations within the document to determine associated values for variables within the macro operations, wherein performing the flow analysis on the macro operations includes performing at least one of a data flow analysis and a control flow analysis;

comparing the macro operations including the associated values for variables against a profile containing information about suspect macro operations and associated values for variables to determine whether the document contains suspect macro operations;

if the document contains suspect macro operations, informing a user that the document contains suspect macro operations; and receiving instructions from the user specifying an action to take with regards to the document.

13. The method of claim 12, wherein the action can include one of:

deleting the document;

cleaning the document to remove suspect macro operations; and not taking any action.

14. The method of claim 12, wherein comparing the macro operations further comprises performing a flow analysis on the macro operations in the document, the flow analysis including the data flow analysis and the control flow analysis.

15. A computer readable storage medium storing instructions that when executed by a computer cause the computer to perform a method for detecting a macro virus in a computer system by statically analyzing macro operations within a document, comprising:

receiving the document containing the macro operations;

locating the macro operations within the document;

performing a flow analysis on the macro operations within the document to determine associated values for variables within the macro operations, wherein performing the flow analysis on the macro operations includes performing at least one of a data flow analysis and a control flow analysis;

comparing the macro operations including the associated values for variables against a profile containing information about suspect macro operations and associated values for variables to determine whether the document contains suspect macro operations; and if the document contains suspect macro operations, informing a user that the document contains suspect macro operations.

16. The computer-readable storage medium of claim 15, wherein the method further comprises after informing the user, receiving instructions from the user specifying an action to take with regards to the document.

17. The computer-readable storage medium of claim 15, wherein performing the flow analysis on the macro operations includes performing the data flow analysis and the control flow analysis.

18. The computer-readable storage medium of claim 15, wherein the macro operations are received in source code form.

19. An apparatus that detects a macro virus in a computer system by statically analyzing macro operations within a document, comprising:

a receiving mechanism that receives the document containing the macro operations;

a macro operation locating mechanism that locates the macro operations within the document;

a flow analysis mechanism that performs a flow analysis on the macro operations within the document to determine associated values for variables within the macro operations, wherein performing the flow analysis on the macro operations includes performing at least one of a data flow analysis and a control flow analysis;

a comparison mechanism that compares the macro operations including the associated values for variables against a profile containing information about suspect macro operations and associated values for variables to determine whether the document contains suspect macro operations; and an informing mechanism that informs a user if the document contains suspect macro operations.

20. The apparatus of claim 19, further comprising an instruction receiving mechanism that is configured to receive instructions from the user specifying an action to take with regards to the document.

21. The apparatus of claim 19, wherein the flow analysis mechanism is configured to perform the data flow analysis and the control flow analysis.

22. The apparatus of claim 19, wherein the macro operations are received in source code form.

23. The method of claim 1, wherein the flow analysis includes the control flow analysis that determines how many times a specific operation is executed.

24. The method of claim 1, wherein the control flow analysis includes backwards data flow analysis on the macro operations.

25. The method of claim 1, wherein the control flow analysis includes both forward data flow analysis and backwards data flow analysis on the macro operations.

26. The method of claim 1, wherein the variables include a filename variable and the values include a specific filename.

* * * * *